US010917502B2

(12) United States Patent
Song et al.

(10) Patent No.: US 10,917,502 B2
(45) Date of Patent: Feb. 9, 2021

(54) METHOD FOR USING METADATA IN INTERNET PROTOCOL PACKETS

(71) Applicant: Futurewei Technologies, Inc., Plano, TX (US)

(72) Inventors: Haoyu Song, San Jose, CA (US);
Andrew G. Malis, Andover, MA (US);
Stewart Bryant, Merstham (GB);
Tianran Zhou, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 2 days.

(21) Appl. No.: 16/176,977

(22) Filed: Oct. 31, 2018

(65) Prior Publication Data
US 2020/0007665 A1  Jan. 2, 2020

Related U.S. Application Data

(60) Provisional application No. 62/692,298, filed on Jun. 29, 2018.

(51) Int. Cl.
*H04L 12/28* (2006.01)
*H04L 29/06* (2006.01)
(Continued)

(52) U.S. Cl.
CPC ............ *H04L 69/166* (2013.01); *H04L 45/74* (2013.01); *H04L 47/31* (2013.01); *H04L 69/163* (2013.01); *H04L 69/22* (2013.01); *H04L 69/325* (2013.01)

(58) Field of Classification Search
CPC .......... H04L 29/0653; H04L 29/06095; H04L 49/3009; H04L 49/309; H04L 45/74
See application file for complete search history.

(56) References Cited

U.S. PATENT DOCUMENTS

2005/0089016 A1* 4/2005 Zhang .................... H04L 43/50
370/351
2009/0122723 A1* 5/2009 Hirano ................... H04W 8/26
370/255
(Continued)

FOREIGN PATENT DOCUMENTS

CN      104520826 A      4/2015
WO    WO-2017201018 A1   11/2017

OTHER PUBLICATIONS

K. Raza, IPv6 Router Alert Option, Apr. 2015, IETF Request for Comments 7506 (Year: 2015).*

(Continued)

*Primary Examiner* — Siren Wei
(74) *Attorney, Agent, or Firm* — Schwegman Lundberg & Woessner, P.A.

(57) ABSTRACT

A method for using metadata in an Internet Protocol (IP) packet is provided. A first processor at a first node sets a dedicated field of the IP packet to a predetermined value to indicate that metadata is present in the IP packet, and adds metadata to the IP packet by inserting the metadata between an original transport header of the IP packet and an original packet payload of the IP packet. A second processor at a second node receives the IP packet from the first node, reads the dedicated field to identify the predetermined value indicating that metadata is present in the IP packet, and identifies the metadata in the IP packet based on the predetermined value.

20 Claims, 4 Drawing Sheets

(51) Int. Cl.
*H04L 12/741* (2013.01)
*H04L 29/08* (2006.01)
*H04L 12/833* (2013.01)

(56) References Cited

U.S. PATENT DOCUMENTS

| 2009/0303991 | A1* | 12/2009 | Kappler | H04L 45/74 |
| | | | | 370/389 |
| 2014/0226662 | A1* | 8/2014 | Frost | H04L 45/74 |
| | | | | 370/392 |
| 2018/0069877 | A1 | 3/2018 | Flowers | |
| 2019/0215384 | A1* | 7/2019 | Kfir | H04L 49/3063 |

OTHER PUBLICATIONS

"International Application No. PCT/CN2019/093605, International Search Report and Written Opinion dated Oct. 9, 2019", (Oct. 9, 2019), 9 pgs.

\* cited by examiner

METHOD FOR USING METADATA IN INTERNET PROTOCOL PACKETS

RELATED APPLICATIONS

This application claims the benefit of priority under 35 U.S.C. § 119(e) to U.S. Provisional Patent Application Ser. No. 62/692,298, filed Jun. 29, 2018, which is incorporated herein by reference in its entirety.

TECHNICAL FIELD

The present disclosure relates to Internet Protocol network communications, and in particular to systems and methods for using metadata in Internet Protocol packets.

BACKGROUND

It is desirable to be able to use metadata in an Internet Protocol (IP) network. Metadata is a set of data, such as path or performance data, that provides information about other data. However, current IP packets do not have a mechanism to support metadata. No current solution exists for this problem. One previously proposed system for transporting metadata in an IP network was to put the original IP packet into a tunnel with other protocols, and then path-associated metadata can be encapsulated in the tunnel header.

The previously proposed system of using a tunnel for metadata can negatively impact a packet's forwarding behavior, by adding extra overhead to the transmission, and thus may not work as expected in an IP network.

SUMMARY

Methods, apparatus, and systems are provided for using metadata in IP protocol packets. Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to a first aspect, the present subject matter relates to a method for using metadata in an Internet Protocol (IP) packet, the method comprising setting, by a first processor at a first node, a dedicated field of the IP packet to a predetermined value to indicate that metadata is present in the IP packet, and adding, by the first processor, metadata to the IP packet by inserting the metadata between an original transport header of the IP packet and an original packet payload of the IP packet. The method further comprises receiving, by a second processor at a second node, the IP packet from the first node, reading, by the second processor, the dedicated field to identify the predetermined value indicating that metadata is present in the IP packet, and identifying, by the second processor, the metadata in the IP packet based on the predetermined value.

In a first implementation form of the method according to the first aspect as such, the dedicated field is an IP Router Alert Option (RAO). In a second implementation form of the method according to the first aspect as such or any preceding implementation form of the first aspect, the RAO is part of an IP version 4 (IPv4) packet. In a third implementation form of the method according to the first aspect as such or any preceding implementation form of the first aspect, the RAO is part of an IP version 6 (IPv6) packet.

In a fourth implementation form of the method according to the first aspect as such or any preceding implementation form of the first aspect, the method further comprises receiving, by a third processor at a third node, the IP packet from the second node, and forwarding, by the third processor at the third node, the IP packet using the original transport header if the third processor does not support option processing.

In a fifth implementation form of the method according to the first aspect as such or any preceding implementation form of the first aspect, the method further comprises receiving, by an $n^{th}$ processor at an $n^{th}$ node, the IP packet, reading, by the $n^{th}$ processor, the dedicated field to identify the predetermined value indicating that metadata is present in the IP packet, identifying, by the $n^{th}$ processor, the metadata in the IP packet based on the predetermined value, extracting and exporting, by the $n^{th}$ processor, the metadata from the IP packet, removing, by the $n^{th}$ processor, the predetermined value from the dedicated field of the IP packet, and forwarding, by the $n^{th}$ processor, the IP packet using the original transport header.

In a sixth implementation form of the method according to the first aspect as such or any preceding implementation form of the first aspect, the method also comprises receiving, by an end host processor, the IP packet from the $n^{th}$ node, reading, by the end host processor, a checksum value of the packet; and accepting, by the end host processor, the IP packet if the checksum value is correct indicating that the $n^{th}$ processor has extracted the metadata from the IP packet.

In a seventh implementation form of the method according to the first aspect as such or any preceding implementation form of the first aspect, the dedicated field is a predetermined IP option. In a eighth implementation form of the method according to the first aspect as such or any preceding implementation form of the first aspect, the predetermined IP option is part of an IP version 4 (IPv4) packet. In a ninth implementation form of the method according to the first aspect as such or any preceding implementation form of the first aspect, the predetermined IP option is part of an IP version 6 (IPv6) packet. In a tenth implementation form of the method according to the first aspect as such or any preceding implementation form of the first aspect, the metadata includes Operations, Administration and Maintenance (OAM) data.

According to a second aspect, the present subject matter relates to a system for using metadata in an Internet Protocol (IP) packet, the system comprising a first processor at a first node, the first processor configured to set a dedicated field of the IP packet to a predetermined value to indicate that metadata is present in the IP packet, and configured to add metadata to the IP packet by inserting the metadata between an original transport header of the IP packet and an original packet payload of the IP packet. The system also comprises a second processor at a second node, the second processor configured to receive the IP packet from the first node, read the dedicated field to identify the predetermined value indicating that metadata is present in the IP packet, and identify the metadata in the IP packet based on the predetermined value.

In a first implementation form of the system according to the second aspect as such, the system further comprises a third processor at a third node, the third processor configured to receive the IP packet from the second node, and forward the IP packet using the original transport header if the third processor does not support option processing. In a second implementation form of the system according to the second aspect as such or any preceding implementation form of the second aspect, the system further comprises an $n^{th}$ processor at an $n^{th}$ node. The $n^{th}$ processor is configured to receive the IP packet, read the dedicated field to identify the predetermined value indicating that metadata is present in the IP packet, identify the metadata in the IP packet based on the predetermined value, extract and export the metadata from the IP packet, remove the predetermined value from the dedicated field of the IP packet, and forward the IP packet using the original transport header. In a third implementation form of the system according to the second aspect as such or any preceding implementation form of the second aspect, the system further comprises an end host processor at an end host. The end host processor is configured to receive the IP packet from the $n^{th}$ node, read a checksum value of the packet, and accept the IP packet if the checksum value is correct indicating that the $n^{th}$ processor has extracted the metadata from the IP packet. In a fourth implementation form of the system according to the second aspect as such or any preceding implementation form of the second aspect, the dedicated field is an IP Router Alert Option (RAO).

According to a third aspect, the present subject matter relates to a non-transitory computer-readable medium, the computer-readable medium storing computer instructions to use metadata in an Internet Protocol (IP) packet, that when executed by two or more processors, cause the two or more processors to perform steps of: setting a dedicated field of the IP packet to a predetermined value to indicate that metadata is present in the IP packet; adding metadata to the IP packet by inserting the metadata between an original transport header of the IP packet and an original packet payload of the IP packet; reading the dedicated field to identify the predetermined value indicating that metadata is present in the IP packet; and identifying the metadata in the IP packet based on the predetermined value.

In a first implementation form of the computer-readable medium according to the third aspect as such, the dedicated field is a predetermined IP option. In a second implementation form of the computer-readable medium according to the third aspect as such or any preceding implementation form of the third aspect, the predetermined IP option is an IP Router Alert Option (RAO). In a third implementation form of the computer-readable medium according to the third aspect as such or any preceding implementation form of the third aspect, the metadata includes Operations, Administration and Maintenance (OAM) data.

Embodiments of the present subject matter can be implemented in hardware, software or in any combination thereof. Any one of the foregoing aspects or implementation forms may be combined with any one or more of the other foregoing aspects or implementation forms to create a new embodiment within the scope of the present disclosure.

This Summary is an overview of some of the teachings of the present application and not intended to be an exclusive or exhaustive treatment of the present subject matter. Further details about the present subject matter are found in the detailed description and appended claims. The scope of the present inventive subject matter is defined by the appended claims and their legal equivalents.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the inventive subject matter, and it is to be understood that other embodiments may be utilized and that structural, logical and electrical changes may be made without departing from the scope of the present inventive subject matter. The following description of example embodiments is, therefore, not to be taken in a limited sense, and the scope of the present inventive subject matter is defined by the appended claims.

In an IP packet network, it is desirable to carry metadata in user packets to be transported from one node to another node. One example of such metadata is Operations, Administration, and Maintenance (OAM) data, which records a user packet's path-associated data within the packet while the packet traverses the network. Additional types of metadata include network performance data user data, and data used to defend against an external attack on a network. Another example of metadata is Network Service Header (NSH) for Service Function Chaining (SFC). Metadata provides in-network services that can be transparent to end users. In various embodiments, the metadata can be used to control a forwarding route, collect forwarding information, and/or enforce security policies in the network. Some metadata is consumed by the data plane, and other metadata can be reported to an administrator, according to various embodiments. Thus, the use of metadata can provide a functional improvement to an IP packet network. However, the IP protocol does not currently include any native mechanism to support inclusion of metadata. Previously proposed solutions include encapsulating the original IP packet with some other protocol and augmenting that protocol with new headers to carry the metadata.

Figure 1:
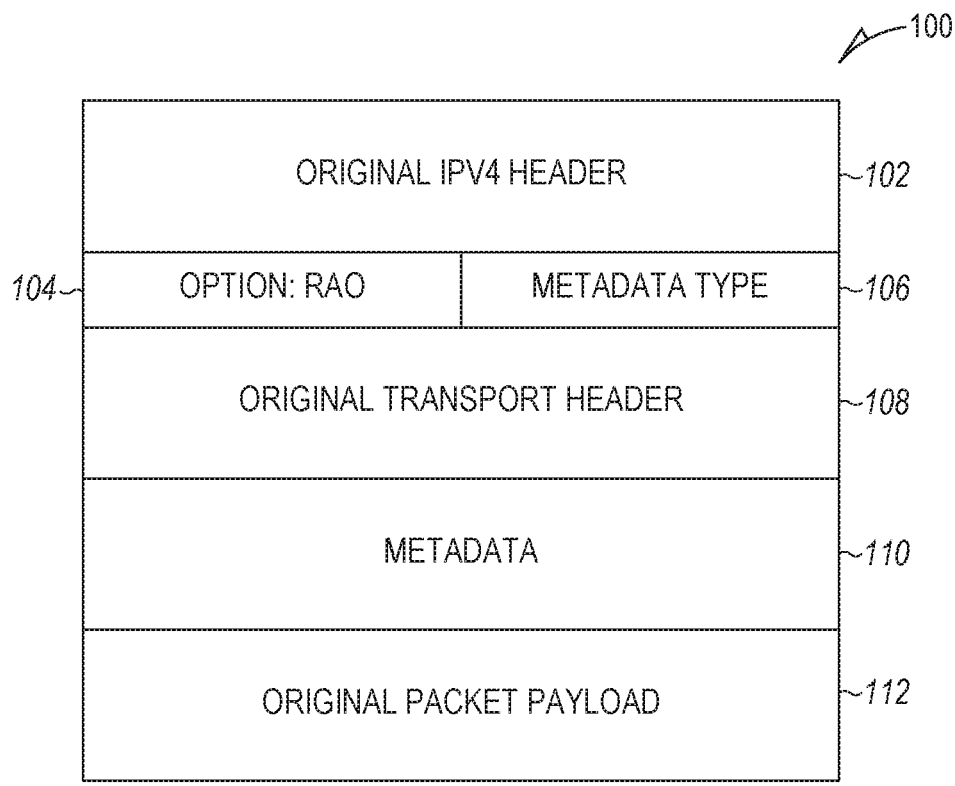
FIG. 1 is a block diagram illustrating a packet for transmitting metadata in IP communications, according to various embodiments.

The present subject matter provides for the addition and processing of metadata to IP packets. FIG. 1 is a block diagram illustrating a packet 100 for transmitting metadata in IP communications, according to various embodiments. The present subject matter can be used with an IP version 4 (IPv4) packet or an IP version 6 (IPv6) packet. The illustrated packet 100 format includes an original IPv4 header 102, original transport header 108, and original packet payload 112. According to various embodiments, the present subject matter uses the IP Router Alert Option (RAO) 104 or another dedicated IP option to indicate the presence of metadata 110. The metadata 110 is inserted between the original transport (e.g., transmission control protocol (TCP)/ user datagram protocol (UDP)) header 108 and the original packet payload 112, in various embodiments.

Figure 2:
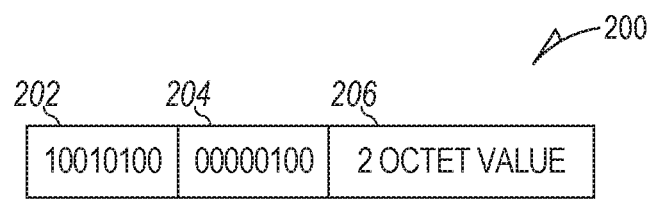
FIG. 2 illustrates a Router Alert Option (RAO) format for IP communications, according to various embodiments.

FIG. 2 illustrates a Router Alert Option (RAO) 200 format for IP communications, according to various embodiments. The IP RAO is defined for IPv4 in Internet Engineering Task Force (IETF) request for comments (RFC) 2113. The RAO 200 includes a first byte of data 202, a second byte of data 204, and a two octet value 206. In the depicted embodiment, the first and second bytes of data 202, 204 show a standard value defined in the RFC. The last two bytes (two octet value 206) are given a specific value to indicate a metadata type, according to various embodiments. When RAO is present (set to non-zero values) in an IP packet, it indicates that the routers should examine this packet more closely, as stated in the RAO specification in the IPv4 standard. RAO has been used by protocols such as Resource Reservation Protocol (RSVP) as defined in IETF RFC 2205, and Internet Group Management Protocol (IGMP) as defined in IETF RFC 3376. The present subject matter uses RAO to indicate metadata in an IP packet for IPv4 communications, in an embodiment.

Figure 3A:
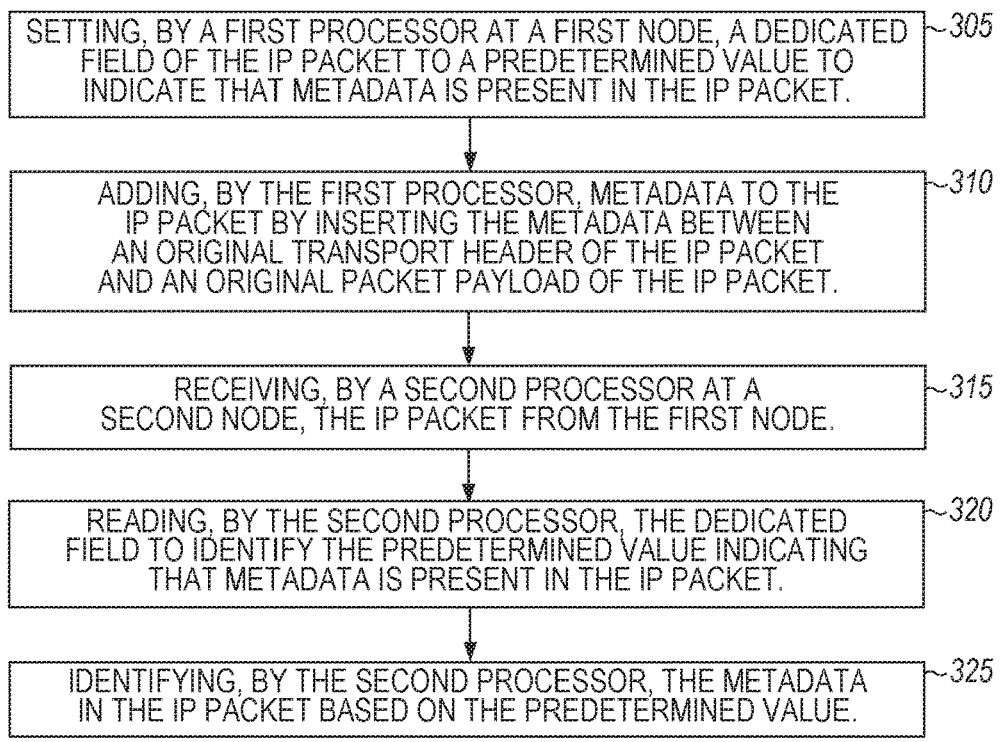
FIG. 3A is a flowchart of a method for using metadata in an IP communication network, according to an embodiment.

FIG. 3A is a flowchart of a method for using metadata in an IP communication network, according to an embodiment. A first processor at a first node sets a dedicated field of the IP packet to a predetermined value to indicate that metadata is present in the IP packet at operation 305, and adds metadata to the IP packet by inserting the metadata between an original transport header of the IP packet and an original packet payload of the IP packet at operation 310. A second processor at a second node receives the IP packet from the first node at operation 315, reads the dedicated field to identify the predetermined value indicating that metadata is present in the IP packet at operation 320, and identifies the metadata in the IP packet based on the predetermined value at operation 325.

According to various embodiments, the dedicated field is an IP Router Alert Option (RAO). The RAO can be part of an IPv4 packet or an IPv6 packet. An IPv6 packet supports RAO in a hop-by-hop extension header, and the IPv6 format is defined in RFC2711. Thus, the RAO format for an IPv6 packet is similar to that of an IPv4 packet, but the encoding differs in that respect. In various embodiments, the method further includes receiving, by a third processor at a third node, the IP packet from the second node, and forwarding, by the third processor at the third node, the IP packet using the original transport header if the third processor does not support option processing. According to various embodiments, packets are forwarded through a number of nodes in a network having n nodes in a path. Various embodiments of the method also include receiving, by an $n^{th}$ processor at an $n^{th}$ node or end node, the IP packet reading the dedicated field to identify the predetermined value indicating that metadata is present in the IP packet, identifying the metadata in the IP packet based on the predetermined value, extracting and exporting the metadata from the IP packet, removing the predetermined value from the dedicated field of the IP packet, and forwarding the IP packet using the original transport header. In various embodiments, an end host processor receives the IP packet from the $n^{th}$ node, reads a checksum value of the packet, and accepts the IP packet if the checksum value is correct indicating that the $n^{th}$ processor has extracted the metadata from the IP packet. In one embodiment, the dedicated field is a predetermined IP option. The predetermined IP option is part of an IPv4 packet or an IPv6 packet, in various embodiments. In an embodiment, the metadata includes Operations, Administration and Maintenance (OAM) data. The metadata can include other types of data without departing from the scope of the present subject matter.

In various embodiments, routers that do not support option processing or that do not recognize the metadata RAO ignore the option without forwarding it to the slow path. Routers that are configured to support the metadata processing will recognize the RAO and process the metadata in the router fast path, in various embodiments. On the forwarding path, the head node is responsible for inserting the RAO and metadata, the intermediate nodes are responsible for parsing the RAO and processing the metadata if needed, and the end node is responsible processing the metadata and removing the RAO and metadata from the packet, in various embodiments.

Figure 3B:
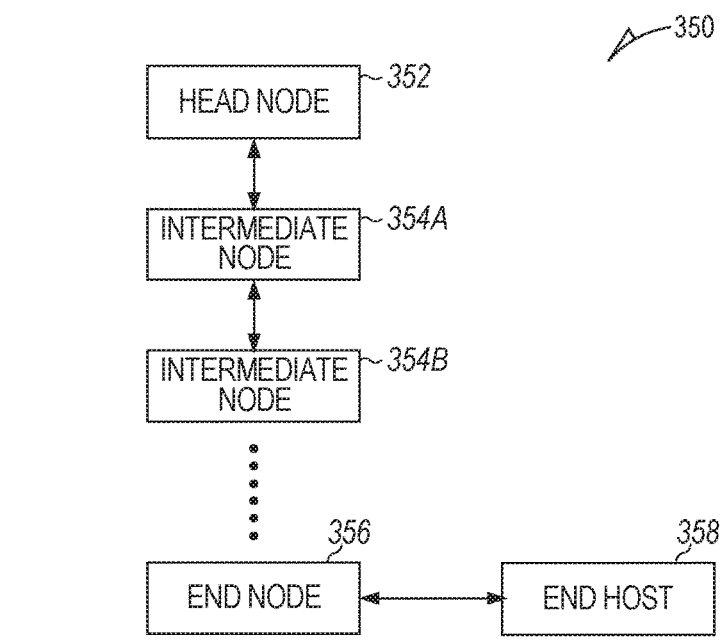
FIG. 3B is a block diagram of an IP communication network used to transmit metadata, according to various embodiments.

FIG. 3B is a block diagram of an IP communication network 350 used to transmit metadata, according to various embodiments. According to various embodiments, the head node 352 augments the original IP header with a new metadata RAO, and then inserts the metadata between the original transport header and the original packet payload. A number of intermediate nodes include 354A and 354B, and can include additional intermediate nodes in various embodiments. If the intermediate node 354A, 354B is a metadata-aware node, the node recognizes the RAO and processes the metadata accordingly. If the intermediate node 354A, 354B is a metadata-unaware node, the node ignores the metadata RAO. The packet is forwarded by both the metadata-aware and metadata-unaware nodes based on the original IP and transport headers, in various embodiments. The end node 356 extracts and exports the metadata, removes the metadata RAO option and the metadata to recover the original packet, and forwards the packet based on the original IP header in various embodiments. The present subject matter can be extended to IP Version 6 (IPv6) since IPv6 also supports the RAO.

In the network when the metadata RAO and the metadata are added to a packet, the modified packet becomes ill-formatted. Such ill-formatted packets are restrained to the metadata processing domain without leaking out of the domain, in various embodiments of the present subject matter. The transport layer checksum is not updated after inserting the metadata, such that the checksum value is now inconsistent. In various embodiments, this inconsistent checksum value can be used as a property to ensure the end host 358 will not accept the packet in the case that the end node 356 fails to remove the metadata. Because the present subject matter does not change the packet header fields (e.g., the five-tuple IP header fields) that affect packet forwarding, it will not change the packet forwarding behavior.

Figure 4:
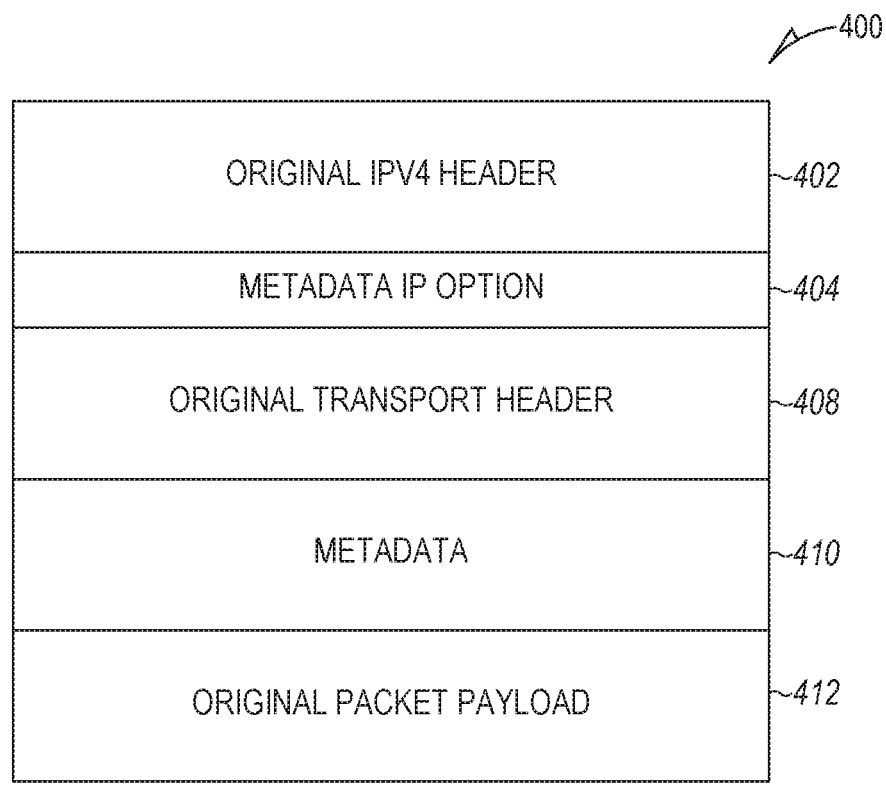
FIG. 4 is a block diagram illustrating a packet for transmitting metadata in IP communications, according to various embodiments.

FIG. 4 is a block diagram illustrating a packet 400 for transmitting metadata in IP communications, according to various embodiments. The packet format includes an original IPv4 header 402, original transport header 408, and original packet payload 412. According to various embodiments, the present subject matter uses an IP option 404 to indicate the presence of the metadata 410. The metadata 410 is inserted between the original transport (e.g., transmission control protocol (TCP)/user datagram protocol (UDP)) header 408 and the original packet payload 412, in various embodiments. In various embodiments, a new IP option number can be assigned to metadata. The metadata option unaware nodes carry an unrecognized option to those nodes. However, in IPv4 unrecognized IP options must be ignored (as defined in IETF RFC 7126, 1122 and 1812), so the packet can still be forwarded normally. As discussed above, the operational details are the same as when using the RAO option as an indication of metadata, and can also be extended for use with IPv6.

Since IP Version 4 (IPv4) networks have the widest deployment base, it is desirable to be able to support metadata encapsulation in pure IPv4 networks. The present subject matter provides for the use of metadata in IP networks such as IPv4 and IPv6 networks, and provides several benefits. One benefit is that the IP packets are still in a format that provides for fast path processing in IP routers. Many applications that process the metadata require fast path processing. The present subject matter allows the routers to process the metadata on the fast path. Another benefit of the present subject matter is the provision for incremental deployment. The present subject matter does not use a full network upgrade to support the metadata processing. Rather, if some nodes are unaware of the metadata, they are able to ignore the metadata and forward the packet as usual. A further benefit of the present subject matter is that it adds and processes metadata without altering the forwarding behavior of the IP packets. For example, Equal Cost Multi Path (ECMP) forwarding uses the five-tuple header fields of the IP packets as the hash key for packet forwarding. The metadata-added packet of the present subject matter does not change the behavior or result. An additional benefit of the present subject matter is that it is transparent to end users. The metadata is intended to be contained in the network. In the present subject matter, the end host receives the packet without noticing it was modified on the forwarding path. In addition, if the modified packets are leaked and delivered, the end hosts deny those packets as corrupted.

Figure 5:
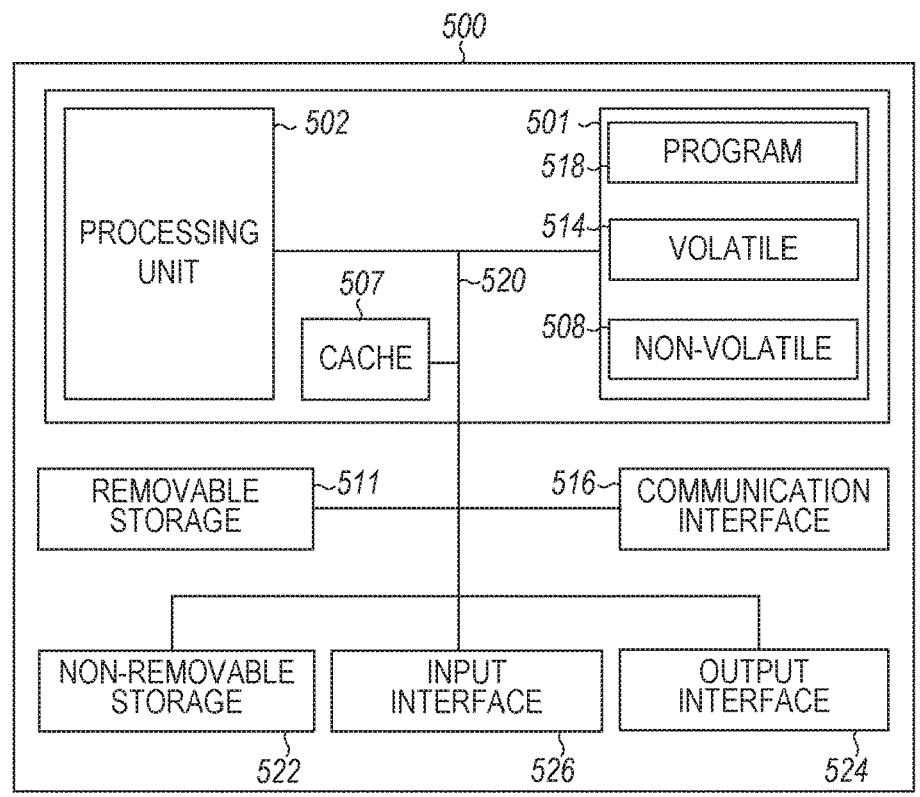
FIG. 5 is a diagram illustrating circuitry for implementing devices to perform methods, according to an example embodiment.

FIG. 5 is a schematic diagram illustrating circuitry for performing methods according to example embodiments. All components need not be used in various embodiments. For example, the computing devices may each use a different set of components and storage devices.

One example computing device in the form of a computer 500 may include a processing unit or processor 502, memory 501, cache 507, removable storage 511, and non-removable storage 522, all coupled by a bus 520. Although the example computing device is illustrated and described as computer 500, the computing device may be in different forms in different embodiments. For example, the computing device may be a router or other computing device including the same or similar elements as illustrated and described with regard to FIG. 5. Further, although the various data storage elements are illustrated as part of the computer 500, the storage may also or alternatively include cloud-based storage accessible via a network, such as the Internet or server-based storage.

In FIG. 5, memory 501 may include volatile memory 514 and/or non-volatile memory 508. Computer 500 may include—or have access to a computing environment that includes—a variety of computer-readable media, such as volatile memory 514 and/or non-volatile memory 508, removable storage 511 and/or non-removable storage 522. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Storage can also include networked storage such as a storage area network (SAN).

Computer 500 may include or have access to a computing environment that includes an input interface 526, an output interface 524, and a communication interface 516. In various embodiments, communication interface 516 includes a transceiver and an antenna. Output interface 524 may include a display device, such as a touchscreen, that also may serve as an input device. The input interface 526 may include one or more of a touchscreen, touchpad, mouse, keyboard, camera, one or more device-specific buttons, one or more sensors integrated within or coupled via wired or wireless data connections to the computer 500, or other input devices. The computer 500 may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth®, or other networks.

Computer-readable instructions, i.e., a program 518, comprises instructions stored on a computer-readable medium that are executable by the processor 502 of the computer 500. The terms "computer-readable medium" and "storage device" do not include carrier waves to the extent carrier waves are deemed too transitory. In one example, the processor 502 executes the program 518 to implement methods for using metadata in an IP packet.

Figure 6:
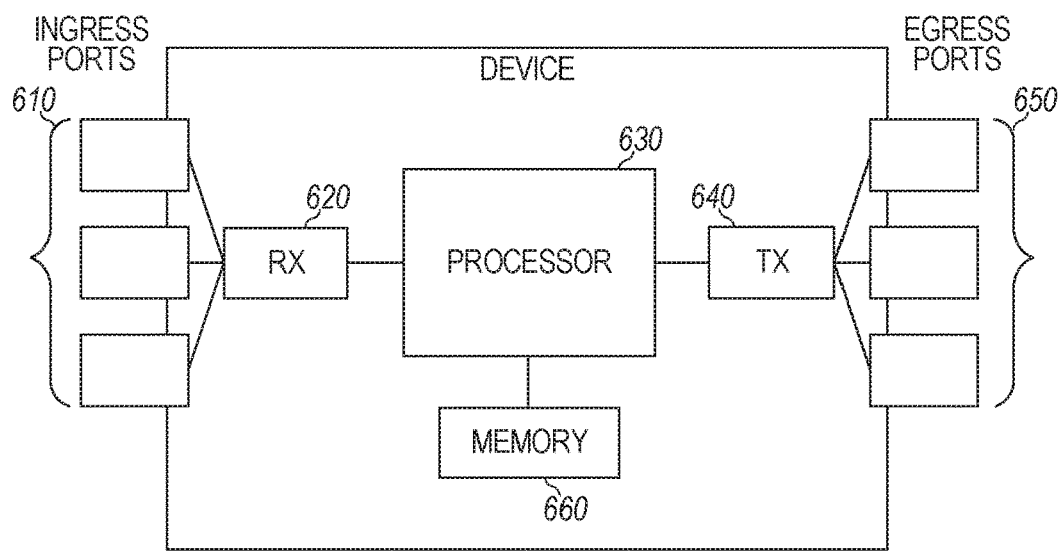
FIG. 6 is a diagram illustrating circuitry for implementing a router device used to perform methods, according to an example embodiment.

FIG. 6 is a schematic diagram of a device, such as an IP router, according to an embodiment of the disclosure. The device may implement the disclosed embodiments. The device comprises ingress ports 610 and a receiver unit (RX) 620 that receive data; a processor, logic unit, or CPU 630 that processes the data; a transmitter unit (TX) 640 that transmits the data; and a memory 660 that stores the data. The processor 630 is any suitable combination of hardware, middleware, firmware, or software. The processor 630 comprises any combination of one or more CPU chips, cores, FPGAs, ASICs, or DSPs. The processor 630 communicates with the ingress ports 610, RX 620, TX 640, egress ports 650, and memory 660.

The memory 660 comprises one or more disks, tape drives, or solid-state drives. The device 600 may use the memory 660 as an over-flow data storage device to store programs when the device 600 selects those programs for execution and to store instructions and data that the device 600 reads during execution of those programs. The memory 660 may be volatile or non-volatile and may be any combination of ROM, RAM, TCAM, or SRAM.

According to one aspect of the present disclosure, a method for using metadata in an Internet Protocol (IP) packet is provided. The method comprises setting, by a first processor at a first node, a dedicated field of the IP packet to a predetermined value to indicate that metadata is present in the IP packet, and adding, by the first processor, metadata to the IP packet by inserting the metadata between an original transport header of the IP packet and an original packet payload of the IP packet. The method further comprises receiving, by a second processor at a second node, the IP packet from the first node, reading, by the second processor, the dedicated field to identify the predetermined value indicating that metadata is present in the IP packet, and identifying, by the second processor, the metadata in the IP packet based on the predetermined value.

Optionally, in any of the preceding aspects, the dedicated field is an IP Router Alert Option (RAO). Optionally, in any of the preceding aspects, the RAO is part of an IP version 4 (IPv4) packet. Optionally, in any of the preceding aspects, the RAO is part of an IP version 6 (IPv6) packet. Optionally, in any of the preceding aspects, the method further comprises receiving, by a third processor at a third node, the IP packet from the second node, and forwarding, by the third processor at the third node, the IP packet using the original transport header if the third processor does not support option processing.

Optionally, in any of the preceding aspects, the method further comprises receiving, by an $n^{th}$ processor at an $n^{th}$ node, the IP packet, reading, by the $n^{th}$ processor, the dedicated field to identify the predetermined value indicating that metadata is present in the IP packet, identifying, by the $n^{th}$ processor, the metadata in the IP packet based on the predetermined value, extracting and exporting, by the $n^{th}$ processor, the metadata from the IP packet, removing, by the $n^{th}$ processor, the predetermined value from the dedicated field of the IP packet, and forwarding, by the $n^{th}$ processor, the IP packet using the original transport header. Optionally, in any of the preceding aspects, the method also comprises receiving, by an end host processor, the IP packet from the $n^{th}$ node, reading, by the end host processor, a checksum value of the packet; and accepting, by the end host processor, the IP packet if the checksum value is correct indicating that the $n^{th}$ processor has extracted the metadata from the IP packet.

Optionally, in any of the preceding aspects, the dedicated field is a predetermined IP option. Optionally, in any of the preceding aspects, the predetermined IP option is part of an IP version 4 (IPv4) packet. Optionally, in any of the preceding aspects, the predetermined IP option is part of an IP version 6 (IPv6) packet. Optionally, in any of the preceding aspects, the metadata includes Operations, Administration and Maintenance (OAM) data.

According to another aspect of the present disclosure, a system for using metadata in an Internet Protocol (IP) packet is provided. The system comprises a first processor at a first node, the first processor configured to set a dedicated field of the IP packet to a predetermined value to indicate that metadata is present in the IP packet, and configured to add metadata to the IP packet by inserting the metadata between an original transport header of the IP packet and an original packet payload of the IP packet. The system also comprises a second processor at a second node, the second processor configured to receive the IP packet from the first node, read the dedicated field to identify the predetermined value indicating that metadata is present in the IP packet, and identify the metadata in the IP packet based on the predetermined value.

Optionally, in any of the preceding aspects, the system further comprises a third processor at a third node, the third processor configured to receive the IP packet from the second node, and forward the IP packet using the original transport header if the third processor does not support option processing. Optionally, in any of the preceding aspects, the system further comprises an $n^{th}$ processor at an $n^{th}$ node. The $n^{th}$ processor is configured to receive the IP packet, read the dedicated field to identify the predetermined value indicating that metadata is present in the IP packet, identify the metadata in the IP packet based on the predetermined value, extract and export the metadata from the IP packet, remove the predetermined value from the dedicated field of the IP packet, and forward the IP packet using the original transport header.

Optionally, in any of the preceding aspects, the system further comprises an end host processor at an end host. The end host processor is configured to receive the IP packet from the $n^{th}$ node, read a checksum value of the packet, and accept the IP packet if the checksum value is correct indicating that the $n^{th}$ processor has extracted the metadata from the IP packet. Optionally, in any of the preceding aspects, the dedicated field is an IP Router Alert Option (RAO).

According to another aspect of the present disclosure, a non-transitory computer-readable medium is provided. The non-transitory computer-readable medium stores computer instructions to use metadata in an Internet Protocol (IP) packet, that when executed by two or more processors, cause the two or more processors to perform steps of: setting a dedicated field of the IP packet to a predetermined value to indicate that metadata is present in the IP packet; adding metadata to the IP packet by inserting the metadata between an original transport header of the IP packet and an original packet payload of the IP packet; reading the dedicated field to identify the predetermined value indicating that metadata is present in the IP packet; and identifying the metadata in the IP packet based on the predetermined value.

Optionally, in any of the preceding aspects, the dedicated field is a predetermined IP option. Optionally, in any of the preceding aspects, the predetermined IP option is an IP Router Alert Option (RAO). Optionally, in any of the preceding aspects, the metadata includes Operations, Administration and Maintenance (OAM) data.

Any one of the foregoing examples may be combined with any one or more of the other foregoing examples to create a new embodiment within the scope of the present disclosure.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

Although the present disclosure has been described with reference to specific features and embodiments thereof, it is evident that various modifications and combinations can be made thereto without departing from the scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method for using metadata in an Internet Protocol (IP) packet, the method comprising:
   setting, by a first processor at a first node, a dedicated field of the IP packet to a predetermined value to indicate that metadata is present in the IP packet;
   adding, by the first processor, metadata to the IP packet by inserting the metadata between an original transport header of the IP packet and an original packet payload of the IP packet;
   receiving, by a second processor at a second node, the IP packet from the first node;
   reading, by the second processor, the dedicated field to identify the predetermined value indicating that metadata is present in the IP packet;

identifying, by the second processor, the metadata in the IP packet based on the predetermined value;

extracting and exporting, by an $n^{th}$ processor at an $n^{th}$ node, the metadata from the IP packet; and removing, by the $n^{th}$ processor, the predetermined value from the dedicated field of the IP packet.

2. The method of claim 1, wherein the dedicated field is an IP Router Alert Option (RAO).

3. The method of claim 2, wherein the RAO is part of an IP version 4 (IPv4) packet.

4. The method of claim 2, wherein the RAO is part of an IP version 6 (IPv6) packet.

5. The method of claim 1, further comprising:

receiving, by a third processor at a third node, the IP packet from the second node; and forwarding, by the third processor at the third node, the IP packet using the original transport header.

6. The method of claim 1, further comprising:

forwarding, by the $n^{th}$ processor, the IP packet using the original transport header.

7. The method of claim 6, further comprising:

receiving, by an end host processor, the IP packet from the $n^{th}$ node;

reading, by the end host processor, a checksum value of the packet; and accepting, by the end host processor, the IP packet.

8. The method of claim 1, wherein the dedicated field is a predetermined IP option.

9. The method of claim 8, wherein the predetermined IP option is part of an IP version 4 (IPv4) packet.

10. The method of claim 8, wherein the predetermined IP option is part of an IP version 6 (IPv6) packet.

11. The method of claim 1, wherein the metadata includes Operations, Administration and Maintenance (OAM) data.

12. A system for using metadata in an Internet Protocol (IP) packet, the system comprising:

a first processor at a first node, the first processor configured to:

set a dedicated field of the IP packet to a predetermined value to indicate that metadata is present in the IP packet; and add metadata to the IP packet by inserting the metadata between an original transport header of the IP packet and an original packet payload of the IP packet; and a second processor at a second node, the second processor configured to:

receive the IP packet from the first node;

read the dedicated field to identify the predetermined value indicating that metadata is present in the IP packet; and identify the metadata in the IP packet based on the predetermined value; and an $n^{th}$ processor at an $n^{th}$ node, the $n^{th}$ processor configured to:

extract and export the metadata from the IP packet; and remove the predetermined value from the dedicated field of the IP packet.

13. The system of claim 12, further comprising:

a third processor at a third node, the third processor configured to:

receive the IP packet from the second node; and forward the IP packet using the original transport header.

14. The system of claim 12, wherein the $n^{th}$ processor is further configured to:

forward the IP packet using the original transport header.

15. The system of claim 14, further comprising:

an end host processor at an end host, the end host processor configured to:

receive the IP packet from the $n^{th}$ node;

read a checksum value of the packet; and accept the IP packet.

16. The system of claim 12, wherein the dedicated field is an IP Router Alert Option (RAO).

17. A non-transitory computer-readable medium storing computer instructions to use metadata in an Internet Protocol (IP) packet, that when executed by three or more processors, cause the three or more processors to perform steps of:

setting a dedicated field of the IP packet to a predetermined value to indicate that metadata is present in the IP packet;

adding metadata to the IP packet by inserting the metadata between an original transport header of the IP packet and an original packet payload of the IP packet;

reading the dedicated field to identify the predetermined value indicating that metadata is present in the IP packet;

identifying the metadata in the IP packet based on the predetermined value;

extracting and exporting the metadata from the IP packet; and removing the predetermined value from the dedicated field of the IP packet.

18. The computer-readable medium of claim 17, wherein the dedicated field is a predetermined IP option.

19. The computer-readable medium of claim 18, wherein the predetermined IP option is an IP Router Alert Option (RAO).

20. The computer-readable medium of claim 17, wherein the metadata includes Operations, Administration and Maintenance (OAM) data.

* * * * *